Jan. 17, 1961    R. B. METZNER    2,968,340
EXPANDED METAL SPRING STRUCTURE AND SEAT
Original Filed June 10, 1957
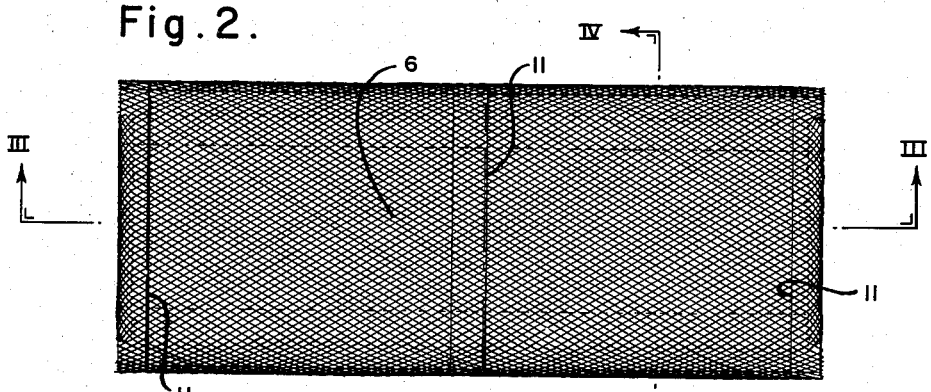
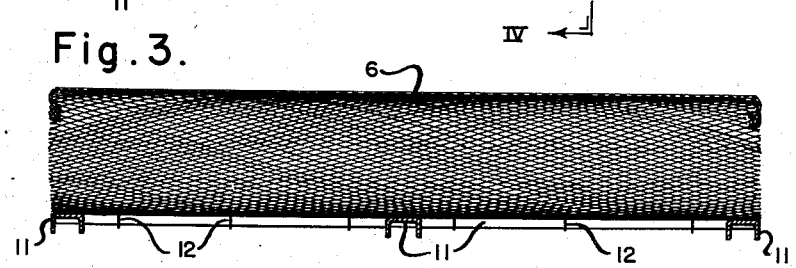
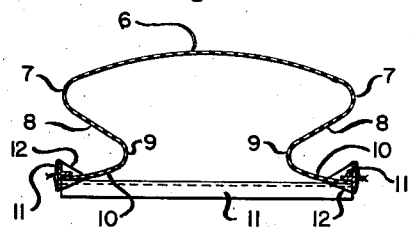
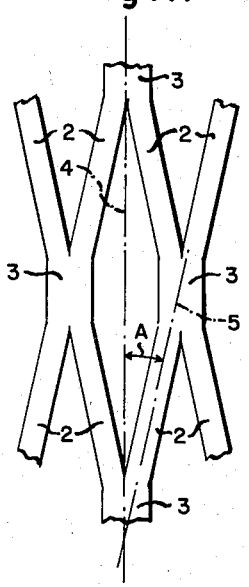
INVENTOR
Robert B. Metzner

United States Patent Office 2,968,340
Patented Jan. 17, 1961

2,968,340

EXPANDED METAL SPRING STRUCTURE AND SEAT

Robert B. Metzner, Wheeling, W. Va., assignor to Wheeling Steel Corporation, Wheeling, W. Va., a corporation of Delaware Continuation of application Ser. No. 664,608, June 10, 1957. This application Apr. 17, 1958, Ser. No. 729,196

2 Claims. (Cl. 155—179)

This invention relates to an expanded metal spring structure and seat. It relates more particularly to a discovery whereby expanded metal is rendered not only suitable but ideally adaptable for use in spring structures, such, for example, as seats for automobiles, and other structures in which the quality of springiness of the expanded metal is useful. The application is a continuation of my copending application Serial No. 664,608, now abandoned, filed June 10, 1957.

Expanded metal is a well known structural material. There are various types of expanded metal, the most common being diamond mesh expanded metal which comprises strands arranged in diamond shape and integrally connected with each other by bonds. Such expanded metal may be made either by the well known guillotine process or by first slitting and thereafter pulling apart or expanding a blank which ultimately becomes a sheet of expanded metal. Expanded metal has great strength for the weight of metal employed and has many uses, such, for example, as in shelving, partition work, lath, window and machinery guards, etc. For some uses the expanded metal is desirably wire brushed to remove shear fins and make it safe to handle. For some uses it is flattened by being rolled and reduced in thickness and at the same time cold worked with consonant increase in strength. Suitably heat treated expanded metal has the quality of springiness which is made use of by my invention.

Theoretically expanded metal would seem to be suitable for applications in which the springiness of the metal is useful. One such application is in the manufacture of seats such as automobile seats which have to have a certain degree of springiness coupled with comfort when used for long periods. Attempts have been made to utilize expanded metal for the manufacture of automobile seats but those attempts have not met with success and no expanded metal automobile seat is on the market today.

I have discovered why the previous attempts to utilize expanded metal for the manufacture of automobile seats have been unsuccessful. The expanded metal has been oriented to flex primary in the direction of the short dimensions of the diamonds of the expanded metal. It has been arranged with the long dimensions of the diamonds extending transversely of the seat or from side to side and the short dimensions of the diamonds extending from front to back. Since a seat is substantially straight from side to side but of generally convex shape from front to back the arrangement of the expanded metal with the long dimensions of the diamonds extending from side to side of the seat imposed to a considerable extent upon the relatively wide bonds of the expanded metal the duty of flexing under load. It was found necessary to sever many of the bonds of the expanded metal in order to provide for a desired degree of resiliency, the result being that the seat did not flex uniformly and loads concentrated in areas where the bonds were severed tended to deform downwardly into the interior of the seat the portions of the metal adjacent the severed bonds. Such tendency to deform downwardly into the interior of the seat the portions of the metal adjacent the severed bonds may be counteracted to some extent by padding applied to the seat, but the use of thick padding is undesirable as it raises the height of the seat surface which in turn necessitates raising the height of the roof of the automobile. The modern emphasis is on low overall height of automobiles so the use of thick padding in the seat is highly undesirable. Also it was theorized that severing of rows of bonds extending in the direction from front to back of the seat produced the equivalent of a connected series of elliptic springs which under load would expand. But in order for the expanded metal to so function it would have to be disposed in the seat so as to be upwardly concave which is contrary to proper seat design.

I have discovered that all of the disadvantages referred to above are overcome when the expanded metal is bent and constructed and arranged to flex in use generally in the direction of the long dimensions of the diamonds. When the expanded metal is so arranged the long slender strands rather than the short relatively wide bonds are primarily subjected to flexure in the longitudinal direction with the result that a more uniform spring action is obtained. It is not necessary to sever any of the bonds and a spring structure or seat may be made of a sheet of expanded metal with all of the bonds intact. Loads are distributed throughout the structure along the strands and through the bonds in all directions. The natural strength of the material, which is very great in comparison with its mass, is utilized to the fullest extent.

The diamonds of expanded metal used in a spring structure or seat should be relatively very long and narrow. The shape of the diamonds is determined by the angular relationship of the strands to the longitudinal axes of the diamonds. Expanded metal can be produced which is ideally suited to uses in which advantage is taken of its springiness, such, for example, as in the manufacture of automobile seats, by inclining the strands to the longitudinal axes of the diamonds at an angle not substantially exceeding 16°. I prefer that the strands be inclined to the longitudinal axes of the diamonds at an angle of about 12° as that angle seems to give optimum performance.

I provide a spring structure of diamond mesh expanded metal comprising strands and bonds, the spring structure being bent and constructed and arranged to flex in use generally in the direction of the long dimensions of the diamonds. The strands of the expanded metal should be inclined to the longitudinal axes of the diamonds at an angle not substantially exceeding 16° and preferably at an angle of about 12°. I also provide a seat of diamond mesh expanded metal comprising strands and bonds, the expanded metal being bent and constructed and arranged to flex in use generally in the direction of the long dimensions of the diamonds and to present upwardly a somewhat upwardly convexly rounded portion adapted to be sat upon so that the seat yields somewhat to weight disposed thereon. The upwardly presented portion should be intermediate the ends of the expanded metal in the direction of the long dimensions of the diamonds.

A free edge of my seat of diamond mesh expanded metal past which the limbs of persons sitting on the seat are adapted to project extends transversely of the long dimensions of the diamonds of the expanded metal, and the seat has adjacent said edge a generally horizontally oriented but upwardly slightly convex top, the top merging in the region of said edge in a downwardly and reversely inclined portion so that when the seat is sat upon the expanded metal flexes generally in the direction of the long dimensions of the diamonds.

In a present preferred form my seat of diamond mesh expanded metal comprising strands and bonds has a generally horizontally oriented but upwardly slightly convex top, the top merging, at opposite sides thereof in the direction of the long dimensions of the diamonds of the expanded metal, into underlying portions inclined downwardly and toward each other so that when the seat is sat upon the expanded metal flexes generally in the direction of the long dimensions of the diamonds.

Other details, objects and advantages of the invention will become apparent as the following description of a present preferred embodiment thereof proceeds.

In the accompanying drawings I have shown a present preferred embodiment of the invention in which Figure 1 is a diagram illustrating the expanded metal which I employ;

Figure 2 is a plan view of an automobile seat made out of expanded metal;

Figure 3 is a longitudinal cross-sectional view of the automobile seat shown in Figure 2 taken on the line III—III of Figure 2; and Figure 4 is a transverse cross-sectional view of the automobile seat shown in Figures 2 and 3 taken on the line IV—IV of Figure 2.

Referring now more particularly to the drawings, there is shown diamond mesh expanded metal comprising strands 2 and bonds 3 integrally connected together as known to those skilled in the art. The angle of inclination of the strands to the longitudinal axes of the diamonds of the expanded metal is less than in conventional diamond mesh expanded metal. In Figure 1 the longitudinal axis of one of the diamonds of the expanded metal is indicated by the chain line 4 and the center line of one of the strands 2 is indicated by the chain line 5. The chain lines 4 and 5 make an angle A with each other. I have found that to provide an optimum spring structure out of diamond mesh expanded metal the angle A should not substantially exceed 16°. I find that for most purposes it is desirable that the angle A be of the order of 12°.

Figures 2, 3 and 4 show a sheet of my expanded metal bent into the form of a seat such as may be used in automobiles. The top of the seat, i.e., the portion thereof adapted to be sat upon, is designated 6. As shown the top is generally horizontally oriented but upwardly slightly convex. From the top 6 the expanded metal is bent generally in the direction of the long dimensions of the diamonds so as to extend downwardly as shown at 7, then somewhat inwardly as shown at 8, then downwardly again as shown at 9 and finally outwardly as shown at 10. The seat thus formed is fastened to any suitable support as known to those skilled in the automobile seat art; Figure 4 shows the seat wired to a metal supporting frame 11 by wires 12. It is also suitably covered as known to those skilled in that art. One of the advantages of my seat is that unprecedentedly thin covering may be used thereon. The seat shown in Figures 2, 3 and 4 is somewhat upwardly convexly rounded and when the portion 6 is sat upon the seat yields somewhat to the weight disposed thereon while generally retaining its shape and being extremely comfortable to the person sitting on it. The portion 6 is as shown in Figures 2, 3 and 4 intermediate the ends of the sheet of expanded metal in the direction of the long dimensions of the diamonds.

I prefer to utilize for making my spring and seat structure expanded metal made out of sheets of spheroidized steel, preferably SAE No. 1035 steel. As an example of a seat which I have made and which has proved fully satisfactory, I employed No. 17 gauge (.0538") steel having diamonds 29/64" in width, the strand width being .082". The expanded metal after being formed was flattened by rolling to No. 18 gauge (.0478"). Any change in stiffness which the customer may desire can be obtained by proper adjustment of the gauge of the metal or the strand size.

The sheets of expanded metal before being formed into seats or other spring structures may be conventionally stress relieved and are preferably flattened. They are then fabricated into the desired seat or spring shape after which they are preferably heated to 1600° F. in a salt bath furnace, quenched in water and drawn at 370° F. I find it desirable to keep the heating time short, a matter of seconds rather than of minutes, and to handle the formed expanded metal quickly to prevent undesired sagging when the metal is at high temperature.

While I have shown and described a present preferred embodiment of the invention it is to be distinctly understood that the invention is not limited thereto but may be otherwise variously embodied within the scope of the following claims.

I claim:

1. A seat of diamond mesh expanded metal comprising strands connected together by bonds both in the direction of the long dimensions of the diamonds and in the direction of the short dimensions of the diamonds generally throughout the diamond mesh expanded metal, a free edge of the seat past which the limbs of persons sitting on the seat are adapted to project extending transversely of the long dimensions of the diamonds of the expanded metal, the seat having adjacent said edge a generally horizontally oriented but upwardly slightly convex top, the top merging in the region of said edge in a downwardly and reversely inclined portion bent generally in the direction of the long dimensions of the diamonds so that when the seat is sat upon the expanded metal flexes generally in the direction of the long dimensions of the diamonds.

2. A seat of diamond mesh expanded metal comprising strands connected together by bonds both in the direction of the long dimensions of the diamonds and in the direction of the short dimensions of the diamonds generally throughout the diamond mesh expanded metal, the seat having a generally horizontally oriented but upwardly slightly convex top, the top merging, at opposite sides thereof in the direction of the long dimensions of the diamonds of the expanded metal, into underlying portions inclined downwardly and toward each other bent generally in the direction of the long dimensions of the diamonds so that when the seat is sat upon the expanded metal flexes generally in the direction of the long dimensions of the diamonds.

References Cited in the file of this patent

UNITED STATES PATENTS

| | | |
|---|---|---|
| 2,104,249 | Vass | Jan. 4, 1938 |
| 2,242,540 | Nordmark | May 20, 1941 |
| 2,341,015 | Blumensaadt et al. | Feb. 8, 1944 |
| 2,400,426 | Liptay et al. | May 14, 1946 |
| 2,678,685 | Volsk | May 18, 1954 |
| 2,692,019 | Zalkind | Oct. 19, 1954 |
| 2,760,561 | Henrikson et al. | Aug. 28, 1956 |

UNITED STATES PATENT OFFICE
CERTIFICATION OF CORRECTION

Patent No. 2,968,340                                 January 17, 1961

Robert B. Metzner

It is hereby certified that error appears in the above numbered patent requiring correction and that the said Letters Patent should read as corrected below.

Column 1, line 21, for "The" read -- This --; line 55, for "primary" read -- primarily --; column 3, line 33, for "provide" read -- produce --.

Signed and sealed this 13th day of June 1961.

(SEAL)
Attest:

ERNEST W. SWIDER                                      DAVID L. LADD
Attesting Officer                                           Commissioner of Patents